Patented July 7, 1953

2,644,804

UNITED STATES PATENT OFFICE 2,644,804

PACKING COMPOSITION CONTAINING POLYTRIFLUOROCHLOROETHYLENE AND AN INORGANIC ANTIFRICTION AGENT

Louis C. Rubin, West Caldwell, N. J., assignor to The M. W. Kellogg Company, Jersey City, N. J., a corporation of Delaware No Drawing. Application April 22, 1950, Serial No. 157,629

10 Claims. (Cl. 260—33.8)

This invention relates to a packing composition. In one aspect the invention relates to a packing composition composed of a perhalogenated compound as a binding material and an anti-friction agent. Various packing compositions are known to those skilled in the art. These compositions, however, are subject to attack by corrosive materials, such as acids and oxygen containing compounds. It is the object of this invention to provide a packing composition which is chemically and physically stable and useful over a relatively wide temperature range and having relatively low friction properties. It is another object of this invention to provide a packing material which can be preformed into a desired shape for use as a packing material. Another object is to provide a packing composition of superior wear and shear strength properties. Still a further object is to provide a packing composition useful with a temperature range between about −200° C. and about 190° C. Various other objections and advantages will become apparent to those skilled in the art from the accompanying description and disclosure.

The packing composition of this invention comprises a polymer of trifluorochloroethylene in admixture with a suitable anti-friction agent. Particularly, the packing composition comprises a thermoplastic polymer of trifluorochloroethylene and inorganic solid anti-friction agents, such as graphite and molybdenum sulfide. These anti-friction agents are wetted by the molten thermoplastic polymer of trifluorochloroethylene and possess good mechanical strength. The preferred anti-friction agents, such as those cited above, possess a coefficient of friction less than about 0.5. The solid anti-friction agent is employed in the form of flakes or granules or small pieces. The size of the solid anti-friction agent, when employed in the form of flakes, is less than ¼ inch in diameter. When granules, or powder form, of solid anti-friction agent is employed the size of the granules is somewhat smaller in diameter than the flakes and, generally, range from 10 to 300 microns in diameter. Although talc, mica and lead may be employed as the anti-friction agents they are less desirable than graphite and molybdenum sulfide since mica is spongy and possesses bad adherence, talc possesses low mechanical strength and lead renders the composition too hard.

The weight ratio of the thermoplastic polymer of trifluorochloroethylene to the inorganic solid anti-friction agent is between about 4:1 and about 1:2, preferably between about 3:1 and about 1:1. The packing composition may, also, contain other modifying ingredients, such as a plasticizer, to reduce the hardness and tendency of thermal plastic polymer of trifluorochloroethylene to crystalize and a material to reduce or minimize the thermal expansion of the packing composition. A suitable plasticizer for the thermoplastic polymer of trifluorochloroethylene is a normally liquid or a waxy polymer of trifluorochloroethylene. The weight ratio of plastic to plasticizer, such as normally liquid and waxy polymers of trifluorochloroethylene, is between about 1:1 and about 10:1, preferably greater than about 4:1 for normally liquid plasticizers. The ingredients of the packing composition, other than the thermoplastic polymer of trifluorochloroethylene, and the inorganic solid anti-friction agent are preferably held below 30 weight per cent of the ultimate composition.

In making up the packing composition, the thermoplastic polymer of trifluorochloroethylene and the inorganic solid anti-friction agent are thoroughly mixed in a vessel. A suitable mixture may be obtained by employing a dispersion of a thermoplastic polymer of trifluorochloroethylene in a dispersant, such as a ketone or an ester. After the mixture is obtained, the dispersant is evaporated or distilled from the mixture leaving the plastic in a finely-divided form in admixture with the solid anti-friction agent. Another method of obtaining a suitable mixture of the anti-friction agent and plastic is admixing the solid anti-friction agent with a plasticizer, such as a waxy polymer of trifluorochloroethylene which has been heated to the molten state. Thereafter, the plastic polymer of trifluorochloroethylene is admixed with the resulting mixture of plasticizer and anti-friction agent. When a mixture of the desired composition is obtained, the mixture is preformed by heating the mixture to a temperature above the fusion temperature of the thermoplastic polymer of trifluorochloroethylene, preferably above 200° C., usually between about 220° C. and about 270° C., for about 1 to 40 minutes.

The molten mass is then preformed under a relatively low pressure below about 1000 pounds per square inch gage followed by quenching by contacting the mold or die with cold water. The use of relatively low preforming pressures prevents the composition from becoming too hard and brittle.

In one embodiment of the invention, graphite flakes of different sizes are employed as the solid anti-friction agent. The two sizes of flakes are usually in the range of about 1/16 to about 1/8 of an inch and in the range of about 1/64 to about 1/32 of an inch in diameter. The proportion of the sizes will vary depending upon the physical characteristic of the ultimate product desired and this can be readily determined by one skilled in the art in making up the compositions. The use of graduated sizes of graphite in admixture materially improves the physical characteristics of the packing composition by increasing the mechanical strength and hardness without undue brittleness and in general improves the packing qualities. It is best to use graduated sizes of solid anti-friction agent with elimination of intermediate size particles. The large particles add strength and hardness and the small particles insure uniformity and prevent brittleness. In using a granular form of inorganic anti-friction agent it has been observed that with smaller sizes of granules less of the inorganic anti-friction agent is necessary to obtain suitable friction properties of the packing composition. However, the exact quantity of the granular anti-friction agent will be determined by the mechanical strength and other physical properties desired for the uses to which the packing composition is subjected.

The size of the thermoplastic employed will vary considerably depending upon its source and the method of mixing the thermoplastic and the anti-friction agent. Generally and preferably, the thermoplastic has a size between about 1 and about 50 microns for best results.

The anti-friction agents and other additional ingredients employed in the packing composition can be obtained on the open market as they are commercially available for many uses. The thermosplastic polymer of trifluorochloroethylene and the normally liquid and waxy polymers of trifluorochloroethylene are, also, available on the open market. In general, these polymers of trifluorochloroethylene are prepared by polymerization of the monomer in the presence of a promoter. The thermoplastic polymer of trifluorochloroethylene is generally produced at a relatively low temperature, usually between about −20 and about 25° C. with a halogen substituted acetyl peroxide, such as trichloroacetyl peroxide, as a promoter under liquid phase conditions. The normally liquid and waxy polymers of trifluorochloroethylene are produced by polymerizing the monomer at higher temperatures usually above room temperature in the persence of a promoter, such as benzoyl peroxide, and a chain transfer solvent, such as chloroform. The preparation of the polymers of trifluorochloroethylene is not part of this invention and further discussion thereof is deemed unnecessary. In the event a more detailed information is desired on these polymers reference may be had to the co-pending application of Wrightson, Dittman and Blum, filed April 21, 1950, Serial No. 157,268. Dispersions of thermoplastic polymers of trifluorochloroethylene alone or in a mixture with suitable plasticizers, such as the liquid or waxy polymers of trifluorochloroethylene are, also, available on the market. These dispersions comprise the plastic and plasticizer dispersed in a ketone, such as di-isobutyl ketone, and a diluent, such as xylene. For a more complete discussion of the dispersions of the thermoplastic polymers of trifluorochloroethylene reference may be had to application Serial No. 136,168, filed December 30, 1949, by Dipner, Teeters and Wrightson.

To distinguish the plastic polymer over the oils and waxes produced with the same monomer, the polymer is described by reference to its no strength temperature. A no strength temperature (N. S. T.) of between about 210° C. and about 350° C is characteristic of a normally solid polymer of the above preparation having plastic characteristics. Best plastic characteristics of the normally solid polymer are observed at N. S. T. values between about 240° C. and about 340° C. The N. S. T. values of the polymer depend upon such factors as temperature, residence time, concentration of promoter, pressure, etc. Since this invention does not relate to the method of producing the polymer of particular characteristics, further discussion thereof will not be undertaken.

The no strength temperature (N. S. T.) is determined in the following manner: A sample of normally solid polytrifluorochloroethylene is hot pressed into a 1/16" thick sheet and cut into a strip of 1/8" x 1/16" . 15/8". The strip is notched 5/8" from the top so that the dimension at the notch shall be 1/16" x 1/16". A fine wire and a standard weight is attached to one end of the strip. The weight of the polymer plus the wire and standard weight shall equal 0.5 gram. The strip is then attached in a furnace and fixed vertically therein. The temperature of the sample is increased at a rate of about 1½° C. per minute in the furnace as the breaking temperature is approached. The no strength temperature (N. S. T.) is the breaking temperature of the sample. Differences of about 5° C. are considered significant.

The following examples are offered as an illustration of the invention showing the composition, method of preparation and characteristics of the packing composition obtained according to this invention. The examples are merely illustrative and should not be considered unnecessarily limiting to the invention.

*Example I*

In this example, the packing composition consists of about 36 weight per cent 300 N. S. T. plastic polymer of trifluorochloroethylene, about 14 weight per cent of a 150° C. melting point waxy polymer of trifluorochloroethylene, about 36 weight per cent of natural graphite as the anti-friction agent of which 21 of the 36 weight per cent is in the form of 1/16 to 1/8 of an inch in diameter flakes and 15 of the 36 weight per cent is 1/64 to 1/32 of an inch in diameter flakes, and about 14 weight per cent of asbestos. The thermoplastic polymer, the particle size of which is about 0.5 to about 10 microns in diameter, and waxy polymer are in the form of a dispersion in di-isobutyl ketone as the dispersant and xylene as the diluent. As above indicated, the weight ratio of plastic to anti-friction agent is about 1:1.

The composition is prepared as follows: Place the graphite and asbestos in a cold mixer, sprinkle a small amount of dispersion over these materials and mix until thorough mixing is obtained. This cycle may require 30 minutes in a pony mixer or about 10–15 minutes in a WP or Day mixer. After this mixing is complete, slowly pour in the polytrifluorochloroethylene dispersion with the mixer running, and continue mixing, for an additional 20–30 minutes. Remove the contents and spread in a stream of air for evaporation of the xylene diluent until a slightly damp condition is reached. Evaporation can be speeded at this point by heating the mixer, while not running, to 250° F. and by directing a stream of air over the materials. All air should be exhausted through a stack for safety reasons.

After air drying, the batch is then given continued mixing for 10–15 minutes in order to fluff the material. If this procedure is followed there should be no balling of the materials, which create a tedious mixing problem. If balling occurs it will be either because the mix is not wet enough in the beginning or is not dry enough in the end, or possibly because the wrong type of equipment is being used.

The mixed materials should then be stored in a covered container until preformed.

Preforming operations include the weighing of a calculated amount of the mix, tamping it lightly into a telescopic type die, closing the die and cold pressing at about 100 p. s. i. or by tapping the die with a soft mallet. After this operation the bottom of the die is removed and the preform is ejected onto a flat pan which has been previously dusted with 160 mesh, water ground Muscouite mica. Preforms should not be handled after ejection. If sticking to the die occurs, wash the die with solvent and dry thoroughly.

The pan of preforms should then be thoroughly dried in a low temperature oven following which it is placed in an oven with circulating heated air set at 220° C. The fusion time depends on the size of the preforms and may range from 7 minutes to 40 minutes. Upon removal from the oven, the pan should be placed in a sink and quenched with cold water. After allowing to dry, the molded rings are ready for shipment. A further wiping with xylene at this point will improve appearance, and lower initial friction. These rings are dimensionally accurate after this fabrication and do not require, nor should they be post-formed. Their coefficient of thermal expansion compares favorably with that of steel.

These molded rings are suitable for pump shaft and valve stem packings from very low speed applications to the highest speeds normally encountered. They are non-scoring and suitable for use on all shaft materials except stainless steel. Their use on stainless steel is satisfactory on pumps handling non-aqueous solutions. They are suitable for sealing against all chemicals except fluorine which will attack the asbestos and molten sodium which has a deleterious effect on the polymer. The recommended temperature range is from about −200° C. to about 160° C.

In installing these molded composition rings the following technique is recommended for best results:

1. Seat each ring separately but not tightly in the packing gland.
2. Insert follower gland, giving nuts two to four complete turns with a wrench, depending on size of the packing rings, release nuts and reset using fingers only. If packing appears to be tight, run intermittently until shaft is fairly free. Caution should be used to prevent tightening of the packing.
3. Start pump and allow leakage at the rate of 20 drops gradual tightening of the gland may be made, finally reducing the leak rate to two drops or less per minute. After the breaking-in adjustments, little attention is required.
4. Lubrication of these packings is not necessary for lower speeds but is necessary on some chemicals at speeds above 1000 feet per minute, shaft surface speed. Lubricants suitable for use against the chemical being handled are also suitable for this packing with the exception of polytrifluorochloroethylene and greases. On mineral acids and caustics, paraffin waxes and greases have performed satisfactorily as a lubricant. Castor oil and glycol lubricants are satisfactory on a number of the solvents.

This product is competitive with all packings now available for many chemical services and superior to most on complex chemical mixtures and compounds, corrosive chemicals and solvents within its recommended temperature range.

*Example II*

In this example, the packing composition consists of about 60 weight per cent of a thermoplastic polymer of trifluorochloroethylene having an N. S. T. of 300° C. and a particle size of 10 to 100 microns, about 20 weight per cent of a heavy oil polymer of trifluorochloroethylene distilling between about 140° C. and about 190° C. at one millimeter of mercury absolute pressure and a kinematic viscosity of about 10 centistokes at 210° F. (98° C.) and 20 weight per cent of granular natural graphite of a particle size of 10 to 100 microns. The weight ratio of plastic to graphite is about 3:1.

The composition is prepared as follows: Place the heavy oil in a clean container, add the graphite and stir until the particles are well wetted, add the 300 N. S. T. plastic and continue stirring until the mix becomes a dark gray. Mixing the oil with the graphite prior to adding the plastic is essential to obtain maximum efficiency of the graphite. Mixing in mechanical mixers should prove satisfactory provided they can reasonably duplicate mortar and pestle action. Cold mill mixing is satisfactory but probably unnecessary.

Since this composition has mold shrinkage characteristics, it cannot be preformed and oven fused as can the composition of Example I. It must be compression molded in contact with the die.

Hardness and strength have a direct relationship in this composition and both can be controlled by pressing technique. High pressure, in preforming or hot pressing, forms a harder, higher strength material. Low pressure preforming and zero pressure during the heating cycle forms a relatively soft but weak material.

Maximum pressure for preforming or pressing should be around 1000 p. s. i. on the material to prevent loss of plasticizer prior to reaching solution temperature. Platen temperatures in the range of 230° C. to 260° C. give satisfactory conversion in a matter of about two minutes after the die reaches temperature, but the best time and temperature relationship should be experimentally determined for each fabricating condition. Quenching in cold water should immediately follow the heating cycle.

These molded rings are suitable for static seals against all chemicals except molten sodium. They should not be recommended for services having a wide fluctuation of temperature because of the relatively high thermal expansion coefficient. Neither should they be recommended for moving shafts because of excessive frictional heat build-up. The recommended temperature range for this composition in a static condition is from −200° C. to 190° C. On high pressure work the maximum temperature should be limited to about 150° C. or 160° C.

*Example III*

In Example III, the composition of the packing material consists of about 46 weight per cent of a thermoplastic polymer of trifluorochloroethylene having an N. S. T. value of 300° C. and a particle size between about 10 and about 100 microns, about 14 weight per cent of a heavy oil polymer of trifluorochloroethylene similar to that of Example II and about 40 weight per cent of molybdenum sulfide of about 120 mesh in size. As in Example I, the weight ratio of plastic to anti-friction agent is about 1:1.

The composition is prepared as follows: Place the heavy oil of polytrifluorochloroethylene in a clean container or mixer, add the molybdenum sulfide and stir until the particles are thoroughly wetted, add the plastic polymer of trifluorochloroethylene 300 and continue mixing until the mix becomes a dark gray. Simple type mechanical mixers are sufficient for this operation as no grinding or milling is necessary.

Since this composition has slight mold shrinkage characteristics, it cannot be oven fused as can the composition of Example I which contained asbestos and less plastic. It must be compression molded or at least fused in contact with the die.

Hardness and strength have a direct relationship in this composition and both are controlled by the pressing technique. High pressure in preforming or hot pressing forms a harder, higher strength material. Low pressure preforming and zero pressure during the heating cycle forms a relatively soft but somewhat weak material. Maximum pressure during preforming or pressing operations should be around 1000 p. s. i. on the material to prevent loss of plasticizer prior to reaching solution temperature. Platen temperatures in the range of about 230° C. to 260° C. give satisfactory conversion in a matter of about two minutes after the die reaches temperature, but the best time and temperature relationship should be experimentally determined for each fabricating condition. Quenching in cold water should immediately follow the heating cycle.

These molded rings are suitable for static seals against all chemicals except molten sodium and those minerals acids which attack the molybdenum sulfide, such as nitric acid, sulphuric acid, and aqua regia.

These rings are not recommended for services having a wide fluctuation of temperature because of the relatively high thermal expansion coefficient. Neither are they recommended for moving shaft applications because of the excessive frictional heat build up.

The recommended temperature range for this composition in a static condition is from −200° C. to 190° C. On high pressure applications, the maximum temperature should be limited to about 150° C.

*Example IV*

In this example, the packing composition consists of about 53 weight per cent of a thermoplastic polymer of trifluorochloroethylene having an N. S. T. value of about 300° C. and 80 mesh in particle size, about 17 weight per cent of a heavy oil polymer of trifluorochloroethylene similar to that of Example II and about 30 weight per cent of natural graphite in the form of 1/64 to 1/32 of an inch in diameter flakes. The weight ratio of plastic to anti-friction agent is about 2:1.

The composition is prepared exactly the same as the composition of Example III.

These molded rings are suitable for static seals against all chemicals except molten sodium. They should not be recommended for services having a wide fluctuation of temperature because of the relatively high thermal expansion coefficient. Neither should they be recommended for moving shafts because of excessive frictional heat build-up. Their use on stainless steel is subject to careful study because of the graphite content. The recommended temperature range for this composition in a static condition is from −200° C. to 190° C. On high pressure applications, the maximum temperature should be limited to 160° C.

Having described my invention, I claim:

1. A packing composition which comprises a coherent mass of a thermoplastic polymer consisting essentially of polymerized trifluorochloroethylene having an N. S. T. between about 240° C. and about 340° C. in admixture with a comminuted solid inorganic anti-friction agent selected from the group consisting of graphite and molybdenum sulfide said polymer and said inorganic anti-friction agent comprising at least 70 weight per cent of the packing composition, the weight ratio of the thermoplastic polymer to the anti-friction agent being between about 4:1 and about 1:2.

2. A packing composition which comprises a coherent mass of a thermoplastic polymer consisting essentially of polymerized trifluorochloroethylene having an N. S. T. between about 210° C. and about 350° C. in admixture with a comminuted solid inorganic anti-friction agent selected from the group consisting of graphite and molybdenum sulfide, the weight ratio of the thermoplastic polymer to the anti-friction agent being between about 4:1 and about 1:2.

3. The packing composition of claim 2 in which said anti-friction agent is graphite.

4. The packing composition of claim 2 in which said anti-friction agent is molybdenum sulfide.

5. A packing composition which comprises a coherent mass of a thermoplastic polymer consisting essentially of polymerized trifluorochloroethylene having an N. S. T. between about 240° C. and about 340° C. in admixture with graphite in a form of graduated sized flakes with the omission of intermediate sized flakes and less than 30 weight per cent of a lower molecular weight polymer of trifluorochloroethylene as a plasticizer, the weight ratio of thermoplastic polymer to anti-friction agent being between about 4:1 and about 1:2 and the weight ratio of thermoplastic polymer to plasticizer being between about 1:1 and about 10:1.

6. A packing composition which comprises a coherent mass of a thermoplastic polymer consisting essentially of trifluorochloroethylene having an N. S. T. between about 210° C. and about 350° C. in admixture with molybdenum sulfide and less than 30 weight per cent of a lower molecular weight polymer of trifluorochloroethylene as a plasticizer, the weight ratio of thermoplastic polymer to molybdenum sulfide being between about 4:1 and about 1:2 and the weight ratio of thermoplastic polymer to plasticizer being between about 1:1 and about 10:1.

7. The packing composition of claim 5 in which said anti-friction agent is graphite in the form of flakes of a size between 1/16 and 1/8 inch in diameter and between 1/64 and 1/32 inch in diameter.

8. A method for preparing a packing composition comprising a coherent mass of a thermoplastic polymer consisting essentially of polymerized trifluorochloroethylene having an N. S. T. between about 210° C. and about 350° C. in admixture with a comminuted solid inorganic anti-friction agent selected from the group consisting of graphite and molybdenum sulfide which comprises admixing powdered thermoplastic polymer of a size between about 1 and 50 microns with the anti-friction agent, heating the resulting mass to a temperature above about 200° C. for about 1 to 40 minutes compressing the heated mixture at a pressure below about 1000 pounds per square inch gage and immediately following compression quenching the mixture in cold water.

9. A method of preparing a packing composition comprising a coherent mass of thermoplastic polymer consisting essentially of trifluorochloroethylene having an N. S. T. between about 240° C. and about 340° C. in admixture with a comminuted solid inorganic anti-friction agent selected from the group consisting of graphite and molybdenum sulfide which comprises admixing powdered thermoplastic polymer in a form of a dispersion of the plastic polymer in di-isobutyl ketone with the comminuted solid inorganic anti-friction agent in the weight ration of plastic polymer to anti-friction agent of about 4:1 to about 1:2, evaporating the dispersion medium from the resulting mixture, thereafter heating the resulting mixture to a temperature above about 200° C. for about 1 to 40 minutes, compressing the heated mixture at a pressure below 1000 pounds per square inch gage and quenching the compressed mixture with cold water.

10. A method of preparing a packing composition comprising a coherent mass of thermoplastic polymer consisting essentially of trifluorochloroethylene having an N. S. T. between about 240° C. and about 340° C. in admixture with a comminuted solid inorganic anti-friction agent selected from the group consisting of graphite and molybdenum sulfide which comprises admixing the anti-friction agent with a lower molecular weight polymer of trifluorochloroethylene, admixing the resulting mixture with the thermoplastic polymer, in the weight ratio of the thermoplastic polymer to plasticizer between about 1:1 and about 10:1, thereafter heating the resulting mixture to a temperature above about 200° C., compressing the heated mixture at a pressure below 1000 pounds per square inch gage and quenching the compressed mixture with cold water.

LOUIS C. RUBIN.

References Cited in the file of this patent

UNITED STATES PATENTS

| Number | Name | Date |
|---|---|---|
| 2,392,388 | Joyce | Jan. 8, 1946 |
| 2,393,967 | Brubaker | Feb. 5, 1946 |